US008563671B2

(12) United States Patent
Gauthier et al.

(10) Patent No.: US 8,563,671 B2
(45) Date of Patent: *Oct. 22, 2013

(54) SUPPORTED METALLOCENE CATALYSTS

(71) Applicant: Fina Technology, Inc., Houston, TX (US)

(72) Inventors: William Gauthier, Houston, TX (US); David Rauscher, Angleton, TX (US); Jun Tian, League City, TX (US); Nathan Williams, Webster, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/622,206

(22) Filed: Sep. 18, 2012

(65) Prior Publication Data
US 2013/0018157 A1    Jan. 17, 2013

Related U.S. Application Data

(63) Continuation of application No. 12/882,268, filed on Sep. 15, 2010, now Pat. No. 8,299,188, which is a continuation-in-part of application No. 11/804,483, filed on May 18, 2007, now abandoned.

(51) Int. Cl.
C08F 4/642    (2006.01)
C08F 4/6592    (2006.01)
C08F 210/06    (2006.01)

(52) U.S. Cl.
USPC ........... 526/165; 526/129; 526/160; 526/348; 526/943; 502/103; 502/120; 502/152

(58) Field of Classification Search
USPC .......... 526/129, 160, 165, 348, 943; 502/103, 502/120, 152
See application file for complete search history.

(56) References Cited

U.S. PATENT DOCUMENTS 7,514,510 B2 *    4/2009    Marin et al. .................. 526/170

* cited by examiner

Primary Examiner — Caixia Lu

(57) ABSTRACT

Method employing a supported metallocene catalyst composition in the production of an isotactic ethylene propylene co-polymer. The composition comprises a metallocene component supported on a particulate silica support having average particle size of 10-40 microns, a pore volume of 1.3-1.6 ml/g, a surface area of 200-400 m$^2$/g. An alkylalumoxane cocatalyst component is incorporated on the support. The isospecific metallocene is characterized by the formula:

$$B(CpRaRb)(FlR'_2)MQ_n \quad (1)$$

or by the formula:

$$B'(Cp'R'aR'b)(Fl')M'Q'_{n'} \quad (2)$$

In the formulas Cp and Cp' are substituted cyclopentadienyl groups, Fl and Fl' are fluorenyl groups, and B and B' are structural bridges. R' are substituents at the 2 and 7 positions, Ra and R'a are substituents distal to the bridge, and Rb and R'b are proximal to the bridge. M and M' are transition metals, Q' is a halogen or a $C_1$-$C_4$ alkyl group; and n' is an integer of from 0-4.

21 Claims, 3 Drawing Sheets

SUPPORTED METALLOCENE CATALYSTS

CROSS-REFERENCE TO RELATED APPLICATIONS

This application is a continuation of U.S. application Ser. No. 12/882,268, filed on Sep. 15, 2010, now issued as U.S. Pat. No. 8,299,188, which is a continuation-in-part of U.S. application Ser. No. 11/804,483, filed May 18, 2007, now abandoned.

FIELD OF THE INVENTION

This invention relates to catalysts and processes for the production of isotactic ethylene-propylene copolymers and more particularly to supported bridged cyclopentadienyl-fluorenyl metallocenes which are supported on alumoxane-treated silica supports and their use in polymerizing isospecific ethylene-propylene copolymers.

BACKGROUND OF THE INVENTION

Cyclopentadienyl-fluorenyl based metallocene catalysts are effective catalysts in the polymerization, including homopolymerization or copolymerization of olefin monomers such as ethylene, propylene and higher olefins or other ethylenically unsaturated monomers. Such metallocenes typically have metallocene ligand structures characterized by bridged cyclopentadienyl and fluorenyl groups. An example is isopropylidene (cyclopentadienyl)(fluorenyl)zirconium dichloride. The cyclopentadienyl group or the fluorenyl group or both can be modified by the inclusion of substituent groups in the cyclopentadienyl ring or the fluorenyl group which modifies the structure of the catalyst and ultimately the characteristics of the polymers produced. Thus, olefin polymers such as polyethylene, polypropylene, which may be atactic or stereospecific such as isotactic or syndiotactic, and ethylene-higher alpha olefn copolymers such as ethylene propylene copolymers, can be produced under various polymerization conditions and employing various polymerization catalysts.

The metallocene catalysts based upon a bridged cyclpentadienylfluorenyl ligand structure can be produced by the reaction of 6,6-dimethyl fulvene, which may be substituted or unsubstituted with fluorene, which in turn may be substituted or unsubstituted, to produce the bridged isopropylidene cyclopentadienylfluorenyl ligand structure. This ligand is, in turn, reacted with a transition metal halide such as zirconium tetrachloride to produce the bridged zirconium dichloride compound.

Fluorenyl ligand may be characterized by a numbering scheme for the fluorenyl ligand in which the number 9 indicates the bridgehead carbon atom. The remaining carbon atoms available to accept substituents are indicated by numbers 1-4 for one C6 ring of the fluorenyl ligand, and by numbers 5-8 for the other C6 ring of the fluorenyl ligand. The cyclopentadienyl group produced by the 6,6dimethy fulvene may be characterized by a numbering scheme in which 1 designates the bridge head carbon atom, with numbers 2 and 5 designating the proximal carbon atoms and 3 and 4 the distal atoms.

Alpha olefin homopolymers or copolymers may be produced using metallocene catalysts under various conditions in polymerization reactors which may be batch type reactors or continuous reactors. Continuous polymerization reactors typically take the form of loop-type reactors in which the monomer stream is continuously introduced into the reactor and a polymer product is continuously withdrawn. For example, polymers such as polypropylene, polyethylene or ethylene-propylene copolymers involve the introduction of a monomer stream into the continuous loop-type reactor along with an appropriate catalyst system to produce the desired olefin homopolymer or copolymer. The resulting polymer is withdrawn from the loop-type reactor in the form of a "fluff" which is then processed to produce the polymer as a raw material in particulate form as pellets or granules. In the case of $C_{3+}$ alpha olefins, such as propylene, 1-butene, 4-methyl-1 pentene, 1-hexene, 1-octene, or substituted ethylenically unsaturated monomers such as styrene or vinyl chloride, the resulting polymer product may be characterized in terms of stereoregularity, for example, isotactic polypropylene or syndiotactic polypropylene.

The structure of isotactic polypropylene can be described as one having the methyl groups attached to the tertiary carbon atoms of successive monomeric units falling on the same side of a hypothetical plane through the main chain of the polymer, e.g., the methyl groups are all above or below the plane. Using the Fischer projection formula, the stereochemical sequence of isotactic polypropylene is described as follows:

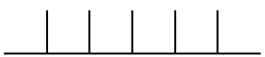

In the above formula, each vertical segment indicates a methyl group on the same side of the polymer backbone. Another way of describing the structure is through the use of NMR. Bovey's NMR nomenclature for an isotactic pentad as shown above is . . . mmmm . . . with each "m" representing a "meso" dyad, or successive pairs of methyl groups on the same side of the plane of the polymer chain. As is known in the art, any deviation or inversion in the structure of the chain lowers the degree of isotacticity and crystallinity of the polymer.

SUMMARY OF THE INVENTION

In accordance with the present invention there are provided supported metallocene catalyst compositions and processes employing such catalysts in the production of an isotactic ethylene propylene co-polymer. The supported catalyst composition of the present invention comprises a metallocene catalyst component supported on a particulate silica support having an average particle size within the range of 10-40 microns, a pore volume within the range of 1.3-1.6 ml/g, and a surface area within the range of 200-400 m²/g. An alkylalumoxane cocatalyst component is incorporated onto said silica support in an amount to provide a weight ratio of alumoxane to silica within the range of 0.6-0.8.

The isospecific metallocene catalyst component is supported on said particulate silica support in an amount of at least 0.5 weight percent of the silica and alkylalumoxane and is characterized by the formula:

$$B(CpRaRb)(FlR'_2)MQ_n \qquad (1)$$

wherein:
Cp is a substituted cyclopentadienyl group,
Fl is a fluorenyl group substituted at the 2 and 7 positions,
B is a structural bridge between Cp and Fl imparting stereorigidity to said catalyst,
Ra is a substituent on the cyclopentadienyl group which is in a distal position to the bridge and comprises a bulky group of the formula $XR^*_3$ in which X is carbon or silicon and R* is the same or different and is chosen from hydrogen or a hydrocarbyl group having from 1-20 carbon atoms, provided that at least one R* is not hydrogen, Rb is a substituent on the cyclopentadienyl ring which is proximal to the bridge and positioned non-vicinal to the distal substituent and is of the formula YR#$_3$ in which Y is silicon or carbon and each R# is the same or different and chosen from hydrogen or a hydrocarbyl group, an alkoxy group, a thioalky group, or an amino, alkyl group containing from 1 to 7 carbon atoms and is less bulky than the substituent Ra, each R' is the same or different and is a hydrocarbyl group having from 4-20 carbon atoms and is more bulky than the substituted Rb with one R' being substituted at the 2 position on the fluorenyl group and the other R' being substituted at the 7 position on the fluorenyl group, M is a transition metal selected from the group consisting of titanium, zirconium, hafnium and vanadium;

Q is a halogen or a $C_1$-$C_4$ alkyl group, and n is an integer of from 0-4.

or by the formula:

$$B'(Cp'R'aR'b)(Fl')M'Q'_{n'} \qquad (2)$$

wherein:

Cp' is a substituted cyclopentadienyl group,

Fl' is a fluorenyl group

B' is a structural bridge between Cp' and Fl' imparting stereorigidity to said catalyst, R'a is a substituent on the cyclopentadienyl group which is in a distal position to the bridge and comprises a bulky group of the formula XR*$_3$ in which X is carbon or silicon and R* is the same or different and is chosen from hydrogen or a hydrocarbyl group having from 1-20 carbon atoms, provided that at least one R* is not hydrogen, R'b is a substituent on the cyclopentadienyl ring which is proximal to the bridge and positioned non-vicinal to the distal substituent and is of the formula YR#$_3$ in which Y is silicon or carbon and each R# is the same or different and chosen from hydrogen or a hydrocarbyl group, an alkoxy group, a thioalky group or an aminoalkyl, or an alkyl group containing from 1 to 7 carbon atoms and is less bulky than the substituent R' a M' is a transition metal selected from the group consisting of titanium, zirconium, hafnium and vanadium;

Q' is a halogen or a $C_1$-$C_4$ alkyl group;

n' is an integer of from 0-4.

The alkylalumoxane component and said metallocene component are present in relative amounts to provide an Al/M mole ratio within the range of 1-1000.

In a further aspect of the invention there is provided a method for the production of an isotactic ethylene propylene copolymer. In carrying out the invention, there is provided a supported metallocene catalyst component comprising an isospecific metallocene catalyst component characterized by Formula (1) or Formula (2) as described above. The metallocene catalyst component further comprises an alkyl alumoxane catalyst component and a particulate silica support characterized by a particle size of 10-40 microns, a surface area of 200-400 m$^2$/gram, and a pore volume within the range of 1.3-1.6 ml./gram. The catalyst is contacted in a polymerization reaction zone with a mixture of propylene and ethylene in an amount within the range of 0.01-20 mole % of ethylene in the ethylene-propylene mixture. The reaction zone is operated under temperature and pressure conditions effective to provide for the isospecific polymerization of the propylene in the presence of the ethylene and at a production of at least 1000 grams of polymer per gram of catalyst. An isotactic ethylene propylene copolymer having a melting temperature of no more than 150° C. is recovered from the reaction zone. In a specific embodiment of the invention, the alkylalumoxane co-catalyst is methylalumoxane which is incorporated into the silica support initially followed by the incorporation of the isospecific metallocene component in an amount within the range of 0.6-0.8 grams of methylalumoxane per gram of silica. In a particular embodiment of the invention, the silica support has an average particle size of 33 microns.

In a further embodiment of the invention the foregoing method for the production of isotactic ethylene propylene copolymer is carried out employing an isospecific metallocene catalyst component characterized by Formula (2) as described above. This metallocene catalyst component and an aklyalumoxane co-catalyst component are supported on a particulate silica support characterized by the particle size, surface area, pore volume, and pore diameter characteristics as described above. In a further aspect of the invention, the substituent R'a of the metallocene component is a phenyl group or a substituted phenyl group or is selected from the group consisting of $C(CH_3)_3$, $C(CH_3)_2Ph$, $CPh_3$, and $Si(CH_3)_3$. More specifically, the substituent R'a is a tert butyl group or a substituted or unsubstituted phenyl group and the substituent R'b is a methyl group or an ethyl group. The bridge B of the isospecific metallocene catalyst component is selected from the group consisting of an alkylidene group having 1 to 20 carbon atoms, a dialkyl germanium or silicon or siloxane, alkyl phosphine or amine. More specifically, the bridge B is an isopropylene group and M is zirconium or titanium.

In yet another embodiment of the invention, there is provided a process for the production of an isotactic ethylene-propylene co-polymer carried out with a supported metallocene catalyst comprising an isospecific metallocene catalyst component characterized by Formula (1) as described above. The supported metallocene catalyst further comprises an alklylalumoxane cocatalyst component and a particulate silica support. The catalyst incorporating the metallocene catalyst component, the alkylalumoxane co-catalyst component and the particulate silica support is contacted in a polymerization reaction zone with a mixture of propylene and ethylene in an amount within the range of 0.01-20 mole percent of ethylene in the ethylene-propylene mixture. The polymerization reaction zone is operated under temperature and pressure conditions effective to provide for the isospecific polymerization of said propylene in the presence of said ethylene at a production of at least 1000 grams of polymer per gram of catalyst to produce an isotactic ethylene propylene copolymer having a melting temperature of no more than 150° C. In one embodiment, the copolymer has a melt flow rate of no more than 20 grams per 10 minutes. Optionally, the polymerization process can include a prepolymerization phase.

In a more specific embodiment of the invention, the isotactic ethylene propylene copolymer has a melting temperature of no more than 120° C. and a melt flow rate of no more than 10 grams per 10 minutes. The ethylene is supplied to the reaction zone in an amount to provide an isotactic ethylene-propylene copolymer having an ethylene content of no more than 10 wt. % ethylene. More specifically, the ethylene-propylene copolymer exhibits a melt flow rate which has an incremental variance with ethylene content when the ethylene content is between 2-7 wt. % of no more than 10 grams per ten minutes and, more specifically, an incremental variance of no more than 5 grams per 10 minutes. Thus as the ethylene content of the ethylene-propylene co-polymer varies from 2 to 7 wt. % of the total polymer, the melt flow index (MI$_2$) does not vary by an incremental amount of more than 10 grams per 10 minutes, and more specifically, it does not vary by an increment of more than 5 grams per 10 minutes.

In yet a further aspect of the invention, the ethylene-propylene copolymer recovered from the reaction zone has a melt flow rate for an ethylene content within the range of 3.0-7.0 wt. % which is less than the melt flow rate for a corresponding ethylene-propylene copolymer having an ethylene content within the range of 2.0-2.9 wt. %.

In another embodiment of the invention there is provided a process for the production of an isotactic ethylene-propylene copolymer comprising the use of a supported metallocene catalyst component comprising an isospecific metallocene catalyst component having a bridged cyclopentadienyl fluorenyl ligand characterized by the formula:

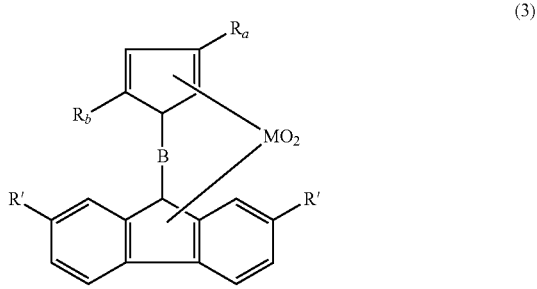

(3)

wherein R$_a$ is a bulky hydrocarbyl group containing from 4 to 20 carbon atoms, R$_b$ is a methyl group or ethyl group, R' is a bulky hydrocarbyl group containing from 4 to 20 carbon atoms, M is a transition metal selected from the group consisting of titanium, zirconium, hafnium, and vanadium, Q is a halogen or a C$_1$-C$_4$ hydrocarbyl group. In Formula (3) B is a structural bridge extending between the cyclopentadienyl and fluorenyl groups, and is an ethylene group or is characterized by the formula:

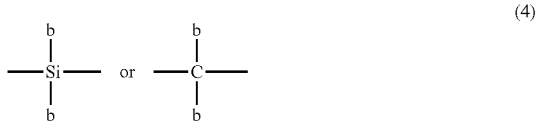

(4)

wherein: b is a C$_1$-C$_4$ alkyl group or a phenyl group. The catalyst further comprises an alkylalumoxane cocatalyst component, and a particulate silica support. The catalyst is contacted in a polymerization reaction zone with a mixture of propylene and ethylene in an amount within the range of 0.01-20 mole percent of ethylene in the ethylene propylene mixture. The reaction zone is operated under temperature and pressure conditions effective to provide for the isospecific polymerization of the propylene in the presence of the ethylene at an activity of at least 1000 grams of polymer per gram of metallocene catalyst to produce an isotactic ethylene propylene copolymer having a melt flow rate of no more than 20 grams per 10 minutes and a melting temperature of no more than 120° C.

In a further aspect of the invention, the isospecific metallocene catalyst component characterized by Formula (3) is further characterized by a substituent Rb which is a methyl group and a substituent Ra which is a tertiary butyl group. The substituent R' may also be a tertiary butyl group. In this embodiment of the invention, the bridge substituent b is a phenyl group, and more particular, the bridge B is a diphenyl methylene group.

DETAILED DESCRIPTION OF THE INVENTION

Figure 1:
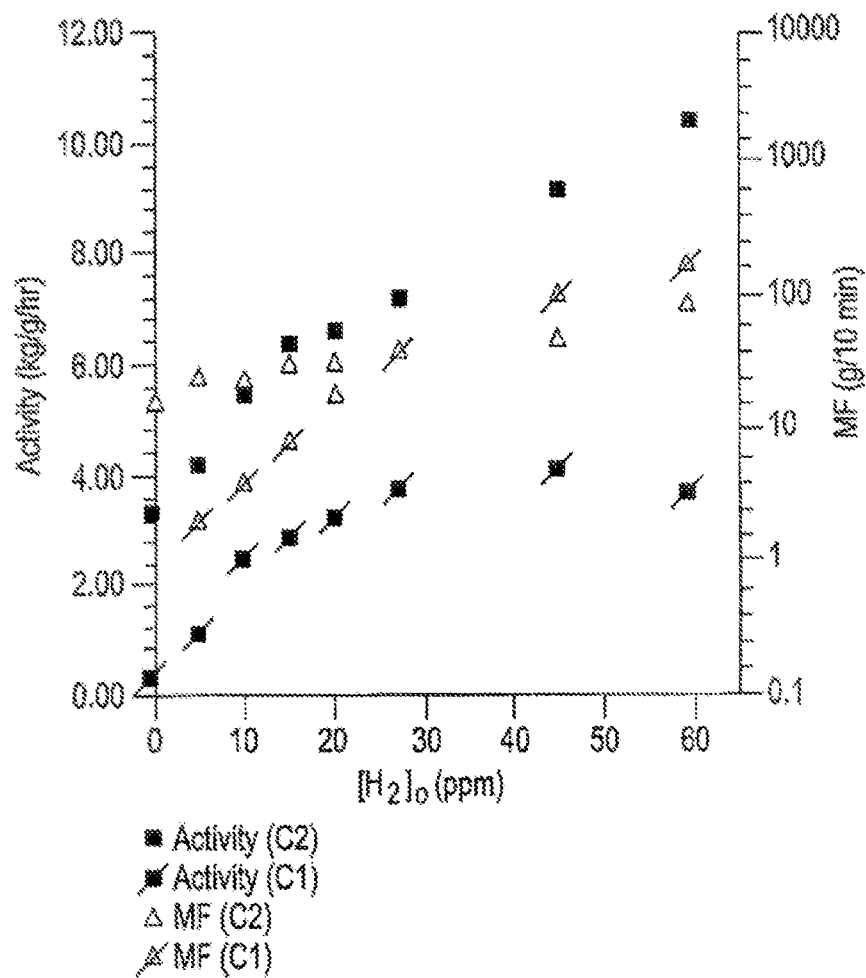
FIG. 1 is a graphical representation showing the relationship between the hydrogen concentration on the abscissa and the catalyst activity and polymer fluff melt flow on the ordinate for copolymerization with catalysts identified as catalysts C1 or C2.

The present invention involves certain supported bridged cyclopentadienyl-fluorenyl metallocenes and their use as catalysts in isotactic polymer propagation. The term "bridged metallocene" as used herein denotes a transition metal coordination compound in which a cyclopentadiendyl group and a fluorenyl group are bridged together with a structural bridge to provide a stereorigid structure and which are coordinated to a central metal ion which may be provided by a Group 3, 4, or 5 transition metal or metal halide, alkyl, alkoxy, aryloxy, or alkoxy halide aryl or the like. The cyclopentadienyl and the fluorenyl groups of the ligand structure are oriented above and below the plane of the central coordinated metal atom. The structural bridge interconnecting the cyclopentadienyl-fluorenyl ligand structure imparts stereorigidity to the metallocene complex to prevent rotation of the cyclopentadienyl and fluorenyl groups about their coordination axes with the transition metal atom.

Cyclopentadienyl-fluorenyl ligands may be characterized by the following structural formula in which the upper and lower cyclopentadienyl and fluorenyl groups are interconnected by a chemical bridge B as described previously.

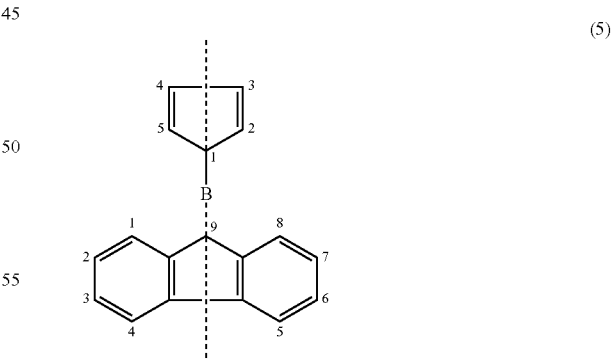

(5)

Formula (5) indicates the numbering scheme used herein in which the bridge head carbon atom of the cyclopentadienyl group is numbered 1 and the bridge head carbon atom of the fluorenyl group is 9. The conjugated carbon atoms of the fluorenyl group are numbered in a sequence in which the directly proximal carbon atoms are numbered 1 and 8 and the distal carbon atoms are numbered 3, 4, 5, and 6. This numbering sequence is shown in the above Formula (5). It is a conventional practice to refer to the symmetry of such ligand structures in terms of a line of symmetry which extends through the two bridge head carbon atoms and the structural bridge as shown by the vertical broken line of Formula (5). The present invention employs cyclopentadienyl-fluorenyl metallocene structures which are substituted in a manner to provide an asymmetrical conformation to the cyclopentadienyl group and a symmetrical conformation to the fluorenyl group. In this conformation, the cyclopentadienyl group is substituted on one side of the broken line at the distal position with a relatively bulky group and on the other side of the broken line at the non-vicinal proximal position with a less bulky group. The fluorenyl group is unsubstituted or substituted at the 2 and 7 positions in combination with the asymmetrical cyclopentadienyl group to provide a symmetrical structure.

Substituents on the fluorenyl group at the 2,7 positions or on the cyclopentadienyl group at the 3 position which are relatively bulky, include tertiary-butyl groups and phenyl groups which can be substituted or unsubstituted. Substituted phenyl groups attached to the fluorenyl ligand at the 2,7 positions or on the cyclopentadienyl group at the 3 position (Ra in Formula 1 or R' a in Formula 2) include 2,6 dimethylphenyl and 2,6 trifluoromethylphenyl groups. Other 2,6 substituents on the phenyl groups include ethyl and isopropyl groups. Substituents on the cyclopentadienyl group at the 5 position (proximal to the bridge) can include hydrocarbyl, alkoxy, thiolkoxy, or amino alkyl groups as described previously which are less bulky than the substituents on the cyclopentadienyl group at the 3 position. Such substituents can include cyclic structures such as cyclopropane, cyclobutane, cyclopentane, furan and thiophene.

The metallocenes of the present invention can be employed in conjunction with a suitable scavenging or polymerization cocatalyst which can be generally characterized by organometallic compounds of metals of Groups IA, IIA, and IIIB of the Periodic Table of Elements. As a practical matter, organoaluminum compounds are normally used as cocatalysts in polymerization reactions. Some specific examples include triethyl aluminum (TEAL), tri-isobutyl aluminum, diethyl aluminum chloride, diethyl aluminum hydride and the like. In addition to scavenging agents such as TEAL, other additives such as anti-fouling agents may be employed in carrying out the present invention. For example, an anti-fouling agent such as pluronic L121, available from BASF Corporation, may be added to the catalyst system. The use of such scavenging agents and anti-fouling agents is disclosed in European Patent Application EP1 316 566A3 to Tharappel et al.

The supported cocatalyst component incorporated onto the silica support is an alkyalumoxane. Such compounds include oligomeric or polymeric compounds having repeating units of the formula:

(6)

where R is an alkyl group generally having 1 to 5 carbon atoms. Alumoxanes are well known in the art and are generally prepared by reacting an organo aluminum compound with water, although other synthetic routes are known to those skilled in the art. Alumoxanes may be either linear polymers or they may be cyclic, as disclosed for example in U.S. Pat. No. 4,404,344. Thus, alumoxane is an oligomeric or polymeric aluminum oxy compound containing chains of alternating aluminum and oxygen atoms, whereby the aluminum carries a substituent, such as an alkyl group. The exact structure of linear and cyclic alumoxanes is not known but is generally believed to be represented by the general formulae —(Al(R)—O—)-m for a cyclic alumoxane, and $R_2Al$—O—(Al(R)—O)m-$AlR_2$ for a linear compound wherein R is independently at each occurrence a $C_1$-$C_{10}$ hydrocarbyl, specifically an alkyl, or halide and m is an integer ranging from 1 to about 50, usually at least about 4. Alumoxanes also exist in the configuration of cage or cluster compounds. Alumoxanes are typically the reaction products of water and an aluminum alkyl, which in addition to an alkyl group may contain halide or alkoxide groups. Reacting several different aluminum alkyl compounds, such as, for example, trimethylaluminum and tri-isobutyl aluminum, with water yields so-called modified or mixed alumoxanes. Specific alumoxanes are methylalumoxane including methylalumoxane modified with minor amounts of other higher alkyl groups such as isobutyl. Alumoxanes may contain minor to substantial amounts of starting aluminum alkyl compounds. Non-hydrolytic means to produce alumoxanes are also known in the art.

The silica supports employed in carrying out the present invention may vary depending upon the nature of the metallocene component. Where the metallocene component incorporates an unsubstituted fluorenyl group in combination with a 3,5 substituted cyclopentadienyl group in accordance with Formula 2, the silica support has an intermediate particle size of 20-35 microns in combination with a surface area of 200-400 $m^2$/gram. The silica support is further characterized by pore volume within the range of 1.3-1.6 ml/gram. A specific support designated herein as Support SI has the following parameters, a particle size of 30-35 microns, a surface area of 250-350 $m^2$/g, and a pore volume of 1.4 ml/g. A silica support as thus characterized may also be employed in carrying out the invention with a metallocene component incorporating a fluorenyl group substituted at the 2 and 7 positions as depicted by the metallocene component of Formula 1. However, in this embodiment of the invention other silica supports may also be employed in carrying out the invention. Such silica supports include, in addition to the previously described silica supports, silica supports as the type described in U.S. Pat. Nos. 6,777,366 to Gauthier, et al, 6,777,367 to Gauthier, and 6,855,783 to Gauthier, et al. Such silica supports are characterized generally as having a particle size within the range of 10-100 microns, a surface area within the range of 200-900 $m^2$/gram, and a pore volume within the range of 0.5-3.5 ml/gram. Such silica supports include support materials having an average particle size within the range of 20-60 microns and an average effective pore diameter within the range of 100-400 Å which accommodate a substantial amount of alumoxane cocatalyst within the internal pore volume of the silica particles as described in U.S. Pat. No. 6,777,366. Other silica supports, suitable for use for this aspect of the invention, include silica supports having an average particle size of 10-60 microns and more specifically 10-15 microns incorporating the alumoxane catalyst predominately on the external surface thereof as described in U.S. Pat. No. 6,777,367. Additional silicate supports which may be employed in carrying out this aspect of the present invention are characterized by having an average particle size of 10-50 microns and a surface area within the range of 200-900 $m^2$/g with a pore volume within the range of 0.9-2.1 ml/gram as described in U.S. Pat. No. 6,855,783.

Exemplary silica supports which may be employed in this aspect of the invention are disclosed in U.S. Pat. No. 6,855,783 as set forth in the following table where they are designated as Supports A, B, C, D, E, and F, together with the characteristic properties of particle size, surface area, and pore volume.

TABLE I

| | Support | | | | | |
|---|---|---|---|---|---|---|
| | A | B | C | D | E | F |
| Avg. Particle Size (micron) | 12.1 | 20 | 12 | 90 | 97 | 21.4 |
| Surface Area (m$^2$/g) | 761 | 300 | 700 | 306 | 643 | 598 |
| Pore volume (mL/g) | 0.91 | 1.4 | 2.1 | 3.1 | 3.2 | 1.7 |

The silicas identified in Table I can be obtained from commercial sources. Thus, silica Supports A and C can be obtained from the Asahi Glass Company under the designations H-121 and H-122, respectively. Silica B is available from Fuji Silysia Chemical, Ltd., under the designation P-10. The MAO (methylalumoxane) and metallocene would be preferentially supported inside the support for Silicas B and C, whereas the MAO and metallocene would be primarily surface-supported in the case of Support A. Supports A, B, and C are of a roughly spheroidal configuration. Supports D and E can be formulated from commercially available silicas available from PQ Corporation under the designations M.S.-3030 and M.S.-3060, respectively. Silica Support F is of a spheroidal configuration and is available from the Asahi Glass Company under the designation H-202.

For a further description of silica supports which may be employed in carrying out the present invention, reference is made to the aforementioned U.S. Pat. Nos. 6,777,366; 6,777,367 and 6,855,783 the entire disclosures of which are incorporated herein by reference.

The supported metallocene of the present invention is formed by initially incorporating the alkylalumoxane component onto the silica support followed by the incorporation of the isospecific metallocene catalyst component. The alkylalumoxane, specifically methylalumoxane is incorporated onto the silica support in an amount to provide 0.4-1 grams per gram silica, and more specifically, 0.6-0.8 grams of methylalumoxane per gram of silica support.

In experimental work respecting the present invention, ethylene-propylene copolymerization studies were carried out employing two catalyst systems having metallocene components exemplary of the metallocene components characterized by Formulas (1) and (2). In both cases the metallocene was supported on the silica support identified previously as Support S-1 which had been pretreated with methylalumoxane to provide about 0.7 grams of methylalumoxane per gram of silica support. In one catalyst system, designated herein as Catalyst C-1, the metallocene component was diphenylmethylene (2-methyl-4-tertiary-butyl-cyclopentadienyl-2,7-di-tertiary-butyl-1-fluorenyl)zirconium dichloride. In a second catalyst system, Catalyst C-2, a metallocene catalyst component exemplary of the component depicted by Formula 2 was employed on the same silica support S-1 pretreated with methylalumoxane similarly as for Catalyst C-1. Here the metallocene catalyst was diphenylmethylene (2-methyl-4-tertiary-butyl-cyclopentadienyl-fluorenyl)zirconium dichloride. In both cases, the metallocene components were loaded onto the methylalumoxane treated silica support to provide a mole ratio of aluminum to zirconium of about 175. In this experimental work, the supported metallocene catalyst components C-1 and C-2 were formed using the same procedure corresponding generally to the catalyst preparation procedure described in the aforementioned U.S. Pat. No. 6,855,783. The copolymerization of the studies are summarized in Table 2 in terms of polymer yield, propylene conversion, productivity and catalyst activity for the two catalyst systems C-1 and C-2 as a function of hydrogen concentration.

As shown in Table 2, the copolymerization activity increased for both of catalysts C1 and C2 along with the hydrogen concentration. The hydrogen attendance changes the activity of catalyst C1 about ten fold within the range of 0~60 ppm. For C2, the increase is about three times. Moreover, catalyst C2 is at least more than twice as active than C1 under the same copolymerization conditions (55° C. and bulk) with ethylene delivery rate of 167 mg/min (integrated to 10 g over one hour). The activity difference varies over the whole range of initial hydrogen concentration of 0 to 60 ppm. When there is no hydrogen in the system, C2 is more than ten times as active as C1 and the difference declines to about two when hydrogen concentration is around 30 ppm, i.e. 3.73 vs 7.16 kg/g/hr. Later on, this disparity enlarges again as the hydrogen concentration increases.

Catalyst C1 offered lower copolymer melt flow than catalyst C2 when the hydrogen concentration is lower than 25 ppm, which corresponds to melt flow of 35 g/10 min. Since C1 shows stronger hydrogen response on melt flow, higher melt flow random copolymer is then obtained by C1 when hydrogen concentration is over 25 ppm as reported in Table 2 and shown in FIG. 1. The melt flow rates reported herein are for the melt flow index (MI$_2$) measured in accordance with the ASTM D1238 at 230° C. and 2.16 kilograms.

TABLE 2

| | [H$_2$]$_o$ | Polymer Yield (g) | | C$_3$= Convn (%) | | Polymn Time (min) | | Activity (kg/g/hr) | | MF (g/10 min) | |
|---|---|---|---|---|---|---|---|---|---|---|---|
| Entry | (ppm)$^{b)}$ | C1 | C2 | C1 | C2 | C1 | C2 | C1 | C2 | C1 | C2 |
| 1 | 0 | 9 | 99 | 1 | 14 | 60 | 60 | 0.30 | 3.31 | | 17 |
| 2 | 5 | 26 | 126 | 4 | 18 | 49 | 60 | 1.08 | 4.19 | 2.1 | 26 |
| 3 | 10 | 66 | 165 | 9 | 23 | 54 | 60 | 2.46 | 5.48 | 4.1 | 24 |
| 4 | 15 | 74 | 191 | 10 | 26 | 60 | 60 | 2.85 | 6.37 | 8.5 | 32 |
| 5 | 20 | 84 | 198 | 12 | 28 | 52 | 60 | 3.20 | 6.58 | 19 | 32 |
| 6 | 27 | 111 | 214 | 15 | 29 | 60 | 60 | 3.73 | 7.16 | 40 | 40 |
| 7 | 45 | 122 | 272 | 17 | 38 | 60 | 60 | 4.06 | 9.10 | 104 | 48 |
| 8 | 59 | 109 | 310 | 15 | 43 | 60 | 60 | 3.61 | 10.37 | 170 | 87 |

Polymerization conditions: 30 mg supported catalyst, ca. 720 g propylene, 60 mg TEAL as scavenger in 2 L Autoclave Zipper reactor at 55° C. for 1 hr. The ethylene flow rate is 167 mg/min over one hour (10 g). The delivery pressure is 500 psig, and the in- and out-pressure difference is below 150 psig.
$^{b)}$[Hydrogen]$_o$ is the concentration before the catalyst was charged into the reactor.

Figure 2:
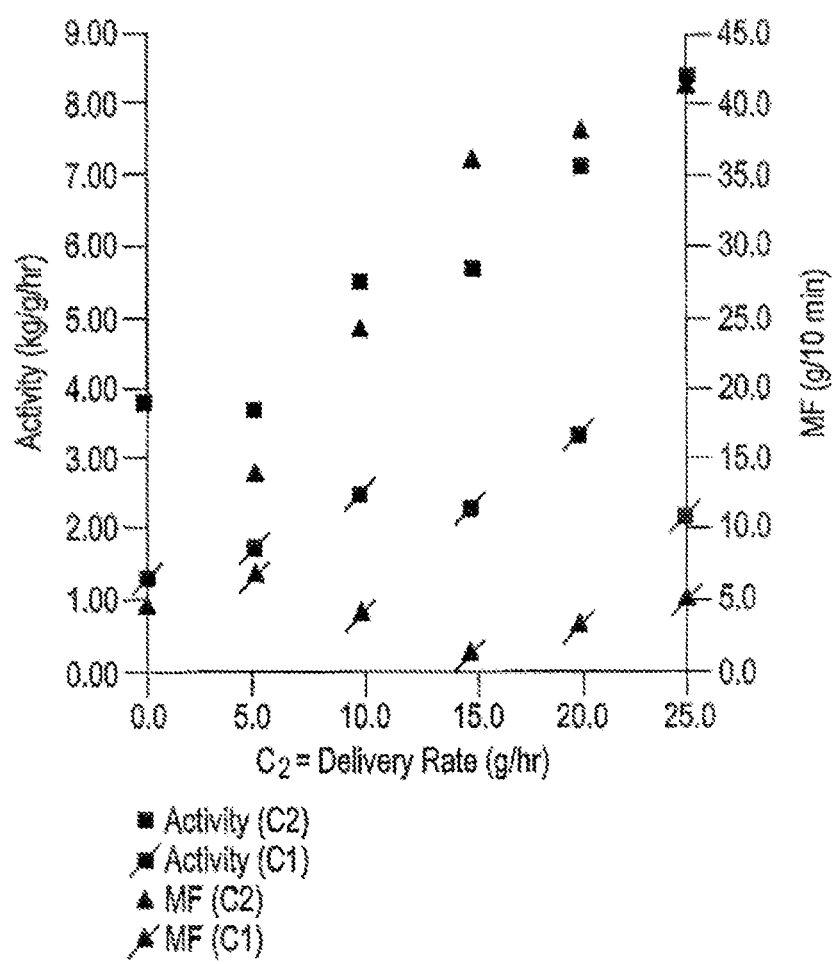
FIG. 2 is a corresponding graphical representation showing catalyst activity and polymer fluff melt flow on the ordinate as a function of ethylene delivery rate on the abscissa.

As shown in Table 3, the effect of ethylene on both catalyst copolymerization performances is significant. The copolymerization activity increased for both catalysts C1 and C2 along with the ethylene delivery rate under the same initial hydrogen concentration of 10 ppm, as shown in Table 3. The presence of ethylene comonomer alters the C1 activity about two and half, i.e. 1.33 vs 3.29 kg/g/hr with ethylene delivery rate of 335 mg/min (20 g introduced into the system over one hour). Almost the same activity difference has also been observed for C2, i.e. 3.79 vs 8.37 kg/g/hr. Moreover, catalyst C2 is about two to three times more active than C1 under the same copolymerization conditions (55° C. and bulk). The activity disparity remains almost the same for the whole ethylene investigation range (1~25 g over one hour delivery). Catalyst C1 offers lower copolymer melt flow than C2, as shown in FIG. 2. In fact, the copolymer melt flow decreases at first with the ethylene concentration; and it starts to increase, as the concentration is over 15 g. Overall, the copolymer melt flows are less than 7 g/10 min, which are much smaller than 19 g/10 min of homopolymer (Entry 1). On the other hand, the melt flows for all copolymers for catalyst C2 are higher than the value of 4.7 g/10 min for the homopolymer. The copolymer melt flow increases from 4.7 to 41 g/10 min as the comonomer concentration increases. C2 shows much more stronger ethylene response on copolymer melt flow than C1 as shown in FIG. 2.

TABLE 3

| | Polymer Yield (g) | | C3 Convn (%) | | Polymn Time (min) | | Activity (kg/g/hr) | | MF (g/10 min) | |
|---|---|---|---|---|---|---|---|---|---|---|
| Entry | [C$_2^-$] (g)[b] | C1 | C2 | C1 | C2 | C1 | C2 | C1 | C2 | C1 | C2 |
| 1 | 0 | 40 | 114 | 6 | 16 | 60 | 60 | 1.33 | 3.79 | 19 | 4.7 |
| 2 | 5 | 52 | 110 | 7 | 15 | 60 | 60 | 1.73 | 3.67 | 6.9 | 14 |
| 3 | 10 | 66 | 165 | 9 | 23 | 54 | 60 | 2.46 | 5.48 | 4.3 | 24 |
| 4 | 15 | 68 | 169 | 9 | 23 | 60 | 60 | 2.27 | 5.65 | 1.2 | 36 |
| 5 | 20 | 86 | 214 | 12 | 29 | 52 | 60 | 3.29 | 7.09 | 3.1 | 38 |
| 6 | 25 | 36 | 252 | 5 | 35 | 34 | 60 | 2.12 | 8.37 | 4.9 | 41 |

Polymerization conditions: 30 mg supported catalyst, ca. 720 g propylene, 60 mg TEAL as scavenger in 2 L Autoclave Zipper reactor at 55° C. for 1 hr. The initial hydrogen concentration (before the catalyst was charged into the reactor) is 10 ppm.
[b]Calibrated mass flow is used for the ethylene delivery over one hour. The delivery pressure is 500 psig, and the in- and out-pressure difference is below 150 psig.

Table 4 sets forth the kinetics of propylene copolymerization with ethylene for both catalysts C1 and C2. The study condition is 55° C. and bulk with an ethylene delivery rate of 333 mg/min (integrated to 20 g over one hour) under hydrogen concentration of 10 ppm. Bench observation shows that the copolymerization activity increases for both C2 and C1 catalysts along with the reaction time. At the later stage of the investigation, the activity of both catalysts is about two times higher than the initial periods (<30 min). Moreover, catalyst C2 is about two to three times more active than C1. The activity disparity remains almost the same for the whole time of investigation.

Figure 3:
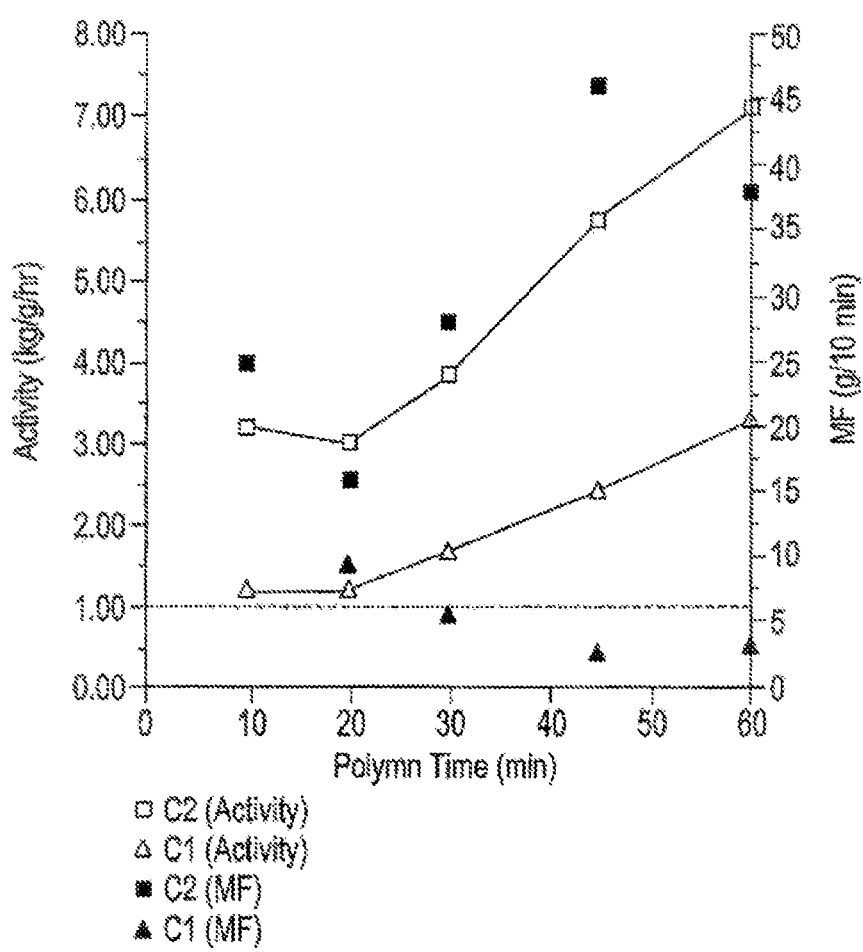
FIG. 3 is a corresponding graphical representation showing catalyst activity (kg/PP/g/h) and polymer fluff melt flow rate on the ordinate as a function of polymerization time on the abscissa.

Catalyst C1 offers lower copolymer melt flow than C2 as shown in FIG. 3. In fact, the copolymer melt flow decreases first with the polymerization time; and it starts to increase as time goes on. C2 starts much earlier at about 20 min, and C1 at a later time of polymerization (45 min). Overall, all the copolymer melt flows for C1 are less than 10 g/10 min, and the melt flows for C2 are higher than 16 g/10 min. C2 shows stronger time response on copolymer melt flow than C1.

TABLE 4

| | Polymer Yield (g) | | C3 Convn (%) | | Activity (kg/g/hr) | | BD (g/cc) | | MF (g/10 min) | |
|---|---|---|---|---|---|---|---|---|---|---|
| Entry | Polymn Time (min) | C2 | C1 | C2 | C1 | C2 | C1 | C2 | C1 | C2 | C1 |
| 1 | 10 | 16 | 6 | 2 | 1 | 3.20 | 1.21 | 0.389 | | 25 | |
| 2 | 20 | 30 | 12 | 4 | 2 | 3.01 | 1.20 | 0.343 | | 16 | 9.5 |
| 3 | 30 | 58 | 25 | 8 | 3 | 3.85 | 1.66 | 0.311 | | 28 | 5.6 |
| 4 | 45 | 130 | 54 | 18 | 7 | 5.74 | 2.41 | [c] | | 46 | 2.6 |
| 5 | 60 | 214 | 86 | 29 | 12 | 7.09 | 3.29 | [c] | | 38 | 3.1 |

Polymerization conditions: 30 mg supported catalyst, ca. 720 g propylene, 60 mg TEAL as scavenger in 2 L Autoclave Zipper reactor at 55° C. The initial hydrogen concentration (before the catalyst was charged into the reactor) is 10 ppm.
Calibrated mass flow is used for the ethylene delivery. The ethylene delivery rate is 333 L/min, and equals to 20 g over an hour. The delivery pressure is 500 psig, and the in- and out-pressure difference is below 150 psig.
[c]Chunky appearance due to the polymerization shutdown procedures and the stickiness of fluffs. All other runs were completed with improved propylene venting procedures.
[d]Too little sample for measurement.

From the foregoing experimental work it can be observed that catalyst C2 homopolymerizations (Entry 1 of Table 3 offers lower resin melt flow and higher catalyst activity under the same laboratory conditions as compared to homopolymerization with catalyst C1. In the case of ethylene-propylene copolymerization, ethylene acts as an activity booster for both catalyst C1 and catalyst C2 systems. Copolymerization activity with catalyst C2 can be enhanced as high as 8 times of homopolymerization activity while for catalyst C1 enhancement is about three times. Ethylene acts as a chain transfer agent in C2 type systems but not in C1 systems. Copolymer produced with catalyst C2 gives a higher melt flow than the corresponding homopolymer produced under the same hydrogen conditions. Catalyst C1 therefore offers a lower melt flow copolymer. Hydrogen appears to act as "slower" chain transfer agent in the copolymerization of propylene with ethylene and the homopolymerization process employing the catalyst C1 system. Lower melt flow component is obtained for the corresponding homopolymer. Under the same copolymerization conditions catalyst C1 offers lower melt flow resins (less than 30 g/10 min) than C2 even though catalyst C2 activity is about 2 to 4 times higher.

The polymers produced in the present invention can be employed in the production of a broad range of products. Thus, the copolymer may be employed to produce films, tapes and fibers. Further, they may be employed to produce molded products by injection molding or blow molding applications. The resins produced exhibit desirably low xylene soluble levels compared to traditional Z—N catalyst systems which is advantageous for organoleptic qualities for instance. For example, the resins may exhibit a xylene soluble level of less than about 0.3 wt. %. Furthermore, the ability to produce a very broad range of MF values from low to high is another considerable advantage of these catalysts and the resins thus produced.

Having described specific embodiments of the present invention, it will be understood that modifications thereof may be suggested to those skilled in the art, and it is intended to cover all such modifications as fall within the scope of the appended claims

The invention claimed is:

1. A method for the production of an isotactic ethylene propylene copolymer comprising:
(a) providing a supported metallocene catalyst comprising:
(i) an isospecific metallocene catalyst component of the formula:

$$B(CpR_aR_b)(FlR'_2)MQ_n \quad (1)$$

wherein:
Cp is a substituted cyclopentadienyl group,
Fl is a fluorenyl group substituted at the 2 and 7 positions,
B is a structural bridge between Cp and Fl imparting stereorigidity to said catalyst,
Ra is a substituent on the cyclopentadienyl group which is in a distal position to the bridge and comprises a bulky group of the formula $XR^*_3$ in which X is carbon or silicon and $R^*$ is the same or different and is chosen from hydrogen or a hydrocarbyl group having from 1-20 carbon atoms, provided that at least one $R^*$ is not hydrogen,
Rb is a substituent on the cyclopentadienyl ring which is proximal to the bridge and positioned non-vicinal to the distal substituent and is of the formula $YR\#_3$ in which Y is silicon or carbon and each $R\#$ is the same or different and chosen from hydrogen or a hydrocarbyl group, an alkoxy group, a thioalky group, or an amino, alkyl group containing from 1 to 7 carbon atoms and Rb is less bulky than the substituent Ra, each R' is the same or different and is a hydrocarbyl group having from 4-20 carbon atoms and is more bulky than the substituent Rb with one R' being located at the 2 position on the fluorenyl group and the other R' being substituted at the 7 position on the fluorenyl group,
and wherein either X or Y, or both X and Y are silicon,
M is a transition metal selected from the group consisting of titanium, zirconium, hafnium and vanadium,
Q is a halogen or a $C_1$-$C_4$ alkyl group, and
n is an integer of from 0-4
or of the Formula:

$$B'(Cp'R'aR'b)(Fl')M'Q'_n \qquad (2)$$

wherein:
Cp' is a substituted cyclopentadienyl group,
Fl' is a fluorenyl group,
B' is a structural bridge between Cp' and Fl' imparting stereorigidity to said catalyst,
R'a is a substituent on the cyclopentadienyl group which is in a distal position to the bridge and comprises a bulky group of the formula $XR^*_3$ in which X is carbon or silicon and $R^*$ is the same or different and is chosen from hydrogen or a hydrocarbyl group having from 1-20 carbon atoms, provided that at least one $R^*$ is not hydrogen,
R'b is a substituent on the cyclopentadienyl ring which is proximal to the bridge and positioned non-vicinal to the distal substituent and is of the formula $YR\#_3$ in which Y is silicon or carbon and each $R\#$ is the same or different and chosen from hydrogen or a hydrocarbyl group, an alkoxy group, a thioalky group or an amino, alkyl group containing from 1 to 7 carbon atoms and is less bulky than the substituent R'a,
and wherein either X or Y, or both X and Y are silicon,
M' is a transition metal selected from the group consisting of titanium, zirconium, hafnium and vanadium,
Q' is a halogen or a $C_1$-$C_4$ alkyl group,
n' is an integer of from 0-4;
(ii) an alkylalumoxane cocatalyst component, and
(iii) a particulate silica support characterized by a particle size of 20-40 microns, a surface area of 200-400 m²/gram, and a pore volume within the range of 1.3-1.6 ml./gram,
(b) contacting said catalyst in a polymerization reaction zone with a mixture of propylene and ethylene in an amount within the range of 0.01-20 mole percent of ethylene in said ethylene-propylene mixture, and;
(c) operating said reaction zone under a temperature and pressure conditions effective to provide for the isospecific polymerization of said propylene in the presence of said ethylene at a production of at least 1000 grams of polymer per gram of catalyst to produce an isotactic ethylene propylene copolymer having a melting temperature of no more than 150° C. and a xylene soluble level of less than about 0.3 wt. %.

2. The method of claim 1 wherein said isotactic ethylene-propylene copolymer has a melt flow rate of no more than 20 grams per 10 minutes.

3. The method claim 1 wherein said alkylalumoxane cocatalyst component is methylalumoxane.

4. The method of claim 3 wherein said methylalumoxane is incorporated onto said silica support initially in an amount within the range of 0.6-0.8 grams of methylalumoxane per gram of silica support followed by the incorporation of said isospecific metallocene catalyst component.

5. The method of claim 4 wherein said silica support has an average particle size of 30-35 microns.

6. A method for the production of an isotactic ethylene propylene copolymer comprising:
(a) providing a supported metallocene catalyst comprising:
(i) an isospecific metallocene catalyst component of the formula:

$$B'(Cp'R'aR'b)(Fl')M'Q'n \qquad (2)$$

wherein:
Cp' is a substituted cyclopentadienyl group,
Fl' is a fluorenyl group,
B' is a structural bridge between Cp' and Fl' imparting stereorigidity to said catalyst,
wherein B' is an isopropylidene group,
wherein the substituent R'a of said metallocene component is a substituted or unsubstituted phenyl group and the substituent R'b is a methyl group or an ethyl group,
M' is a transition metal selected from the group consisting of titanium, zirconium, hafnium and vanadium,
Q' is a halogen or a C1-C4 alkyl group; and
n' is an integer of from 0-4,
(ii) an alkylalumoxane cocatalyst component, and
(iii) a particulate silica support characterized by a particle size of 20-35 microns, a surface area of 200-400 m2/gram, a pore volume within the range of 1.3-1.6 ml./gram and a pore diameter within the range of 200-240 Å,
(b) contacting said catalyst in a polymerization reaction zone with a mixture of propylene and ethylene in an amount within the range of 0.01-20 mole percent of ethylene in said ethylene-propylene mixture, and
(c) operating said reaction zone under a temperature and pressure conditions effective to provide for the isospecific polymerization of said propylene in the presence of said ethylene at a production of at least 1000 grams of polymer per gram of catalyst to produce an isotactic ethylene propylene copolymer having a melting temperature of no more than 150° C.

7. The method of claim 6 wherein M is zirconium or titanium.

8. A method for the production of an isotactic ethylene propylene copolymer comprising:
(a) providing a supported metallocene catalyst comprising:
(i) an isospecific metallocene catalyst component of the formula:

$$B(CpRaRb)(FlR'_2)MQ_n \qquad (1)$$

wherein:
Cp is a substituted cyclopentadienyl group,
Fl is a fluorenyl group substituted at the 2 and 7 positions, B is a structural bridge between Cp and Fl imparting stereorigidity to said catalyst,
wherein B is an isopropylidene group,
Ra is a substituent on the cyclopentadienyl group which is in a distal position to the bridge and comprises a bulky group of the formula $XR^*_3$ in which X is carbon or silicon and $R^*$ is the same or different and is chosen from hydrogen or a hydrocarbyl group having from 1-20 carbon atoms, provided that at least one $R^*$ is not hydrogen,
Rb is a substituent on the cyclopentadienyl ring which is proximal to the bridge and positioned non-vicinal to the distal substituent and is of the formula $YR\#_3$ in which Y is silicon or carbon and each R# is the same or different and chosen from hydrogen or a hydrocarbyl group, an alkoxy group, a thioalkyl group, or an amino, alkyl group containing from 1 to 7 carbon atoms and is less bulky than the substituent Ra,
each R' is the same or different and is a hydrocarbyl group having from 4-20 carbon atoms and is more bulky than the substituted Rb with one R' being substituted at the 2 position on the fluorenyl group and the other R' being substituted at the 7 position on the fluorenyl group,
and wherein either X or Y, or both X and Y are silicon,
M is a transition metal selected from the group consisting of titanium, zirconium, hafnium and vanadium;
Q is a halogen or a $C_1$-$C_4$ alkyl group;
n is an integer of from 0-4,
(ii) an alkylalumoxane cocatalyst component, and
(iii) a particulate silica support,
(b) contacting said catalyst in a polymerization reaction zone with a mixture of propylene and ethylene in an amount within the range of 0.01-20 mole percent of ethylene in said ethylene-propylene mixture; and
(c) operating said reaction zone under a temperature and pressure conditions effective to provide for the isospecific polymerization of said propylene in the presence of said ethylene at a production of at least 1000 grams of polymer per gram of catalyst to produce an isotactic ethylene propylene copolymer having a melting temperature of no more than 150° C.

9. The method of claim 8 wherein said isotactic ethylene propylene copolymer has a melt flow rate of no more than 80 grams per 10 minutes.

10. The method of claim 8 wherein said isotactic ethylene propylene copolymer has a melt flow rate of no more than 20 grams per 10 minutes.

11. The method of claim 10 wherein said isotactic ethylene propylene copolymer has melting temperature of no more than 120° C.

12. The method of claim 11 wherein said isotactic ethylene propylene copolymer has a melt flow rate of no more than 10 grams per 10 minutes.

13. The method of claim 7 wherein ethylene is supplied to said reaction zone in an amount to produce an isotactic ethylene propylene copolymer having an ethylene content of no more than 10 weight percent ethylene.

14. The method of claim 8 wherein said ethylene propylene copolymer exhibits a melt flow rate which has an incremental variance with ethylene content when said ethylene content is between 2-7 weight percent of no more than 10 grams per 10 minutes.

15. The method of claim 14 wherein said copolymer exhibits an incremental variance with ethylene content when said ethylene content is within the range of 2-7 wt percent of no more than 5 grams per 10 minutes.

16. The method of claim 8 wherein said ethylene propylene copolymer has a melt flow rate for an ethylene content within the range of 3.0-7.0 wt. % which is less than the melt flow rate for a corresponding ethylene propylene copolymer having an ethylene content within the range of 2.0-2.9 wt. %.

17. The method of claim 8 wherein the substituent Ra of said metallocene component is a tert butyl group or a substituted or unsubstituted phenyl group.

18. The method of claim 8 wherein the Ra substituent of said metallocene component is a phenyl group or a substituted phenyl group or is selected from the group consisting of $C(CH_3)_3$, $C(CH_3)_2Ph$, $CPh_3$, and $Si(CH_3)_3$.

19. The method of claim 8 wherein the Rb substituent of said metallocene component is a methyl group or an ethyl group.

20. The method of claim 8 wherein M is zirconium or titanium.

21. The method of claim 20 wherein Q is independently a halogen or methyl group.

* * * * *